Patented Sept. 17, 1940

2,214,930

UNITED STATES PATENT OFFICE 2,214,930

METHOD FOR THE PREPARATION OF A CATALYST FOR OXIDATION REACTIONS

Edwin R. Littmann, Wilmington, Del., assignor to Hercules Powder Company, Wilmington, Del., a corporation of Delaware No Drawing. Application December 28, 1938, Serial No. 248,037

7 Claims. (Cl. 23—234)

This invention relates to an improved method for the preparation of a catalytic contact mass, and more particularly to a method for the production of vanadium oxide contact masses suitable for the partial oxidation of organic compounds.

In the usual method of preparing catalytic contact masses, a solution of a salt of a metal, the oxide of which is to serve as a catalyst, is evaporated to dryness in the presence of a suitable carrier or catalyst support. In this operation, the metal salt is deposited in the pores and on the surface of the carrier. The coated and impregnated carrier is then ignited in the presence of a suitable gas to decompose the metal salt, leaving the desired catalytic metal oxide deposited on the carrier.

To be entirely satisfactory as a catalyst contact mass for the partial oxidation of organic compounds, the metal oxide must be deposited so that it clings tightly to the carrier and is of mechanical and thermal stability. Furthermore, it must be of high catalytic activity, and capable of maintaining a high catalytic activity over an extended period of time.

It has heretofore been considered necessary to produce a metal oxide in situ on the surface of a suitable carrier or support by the ignition of a salt, to produce a contact mass of high catalytic activity and of good mechanical and thermal stability. Such production of the catalytic metal oxide has involved close control, since the catalytic activity of the oxide is materially reduced, if the salt is not completely decomposed or if the oxide is sintered by the use of too high a temperature.

It is the object of this invention to provide a method for the preparation of a vanadium oxide contact mass in which the vanadium oxide is formed in situ on the surface of the carrier or support, to produce a contact mass of high catalytic activity, mechanical stability and thermal stability, without utilizing the delicate step of igniting the contact mass.

By the method in accordance with this invention, a suitable catalyst support or carrier is impregnated and coated with a solution of a hydrolyzable, pentavalent vanadium compound in an inert organic solvent, and then treated with water to hydrolyze the vanadium compound and deposit vanadium oxide on the support. The organic solvent, and water are removed from the contact mass, as, for example, by decantation and/or evaporation. Alternately, by the method in accordance with this invention, the catalyst support or carrier is wet with water and then treated with a solution of a hydrolyzable, pentavalent vanadium compound in an inert organic solvent to deposit vanadium oxide on the support, and then the organic solvent and water removed from the support.

The pentavalent vanadium compound utilized in this method is one which is soluble in an organic solvent and which is readily hydrolyzed on contact with water to release vanadium pentoxide and a compound which is relatively soluble in water, the organic solvent used, or both, or which is volatile and readily evaporates upon drying the contact mass. Usually it is preferable to utilize a vanadium compound which does not release a highly corrosive compound when hydrolyzed to release vanadium oxide.

Vanadium compounds which entirely fulfil the above requirements and which are satisfactory for use in my method are the organic esters of vanadic acid, such as, for example, ethyl vanadate, propyl vanadate, butyl vanadate, etc.

Many different organic solvents may be used in the method in accordance with this invention to dissolve the hydrolyzable vanadium compound. The particular organic liquid utilized must merely be a solvent for the vanadium compound and not capable of reacting with it under the conditions of use. Suitable solvents are, for example, benzene, toluene, petroleum ether, gasoline, anhydrous ethyl alcohol, anhydrous propyl alcohol, butyl alcohol, etc.

The carrier or catalyst support utilized in the method in accordance with this invention may be any of the many catalyst supports known to the art, such as, for example, crystalline aluminum oxide in the form known to the trade as "Alundum," silica, coralite brick fragments, pumice, etc. In general, I prefer to utilize aluminum oxide in the form known to the trade as "Tabular Corundum" as disclosed and claimed in the copending application of John M. Weiss, Serial No. 219,187 filed July 14, 1938. "Tabular Corundum" is a crystalline aluminum refractory material having readily bonded surfaces and consisting essentially of interlocked corundum crystals in tabular form, having the contained impurities disseminated in minute globules throughout the crystalline alumina, and being substantially free from intercrystalline glass, so that the refractory particles possess the properties of corundum rather than those of the glass or matrix of impurities.

The carrier or catalytic support which I utilize in the method in accordance with this invention will desirably be in the form of pellets or particles which are within the range of about 4 to about 20 mesh in size and preferably within the range of about 6 to about 10 mesh in size. The amount of vanadium oxide deposited upon the carrier in the method in accordance with this invention will ordinarily be within the range of about 1.0% to about 20.0% or even higher, and usually within the range of about 5% to about 12%, by weight.

The amount of vanadium oxide deposited upon the carrier or catalytic support in this method can be readily adjusted and controlled by adjusting the concentration of the solution of the hydrolyzable, pentavalent vanadium compound utilized. As will be readily appreciated, the more concentrated the solution utilized, the more vanadium oxide will be deposited upon the support in carrying out my method.

The esters of vanadic acid, which I prefer to utilize in carrying out the method in accordance with this invention, may be prepared by several methods. By one of these methods, vanadium pentoxide is refluxed with anhydrous alcohol until it dissolves therein. Thus, for example, butyl vanadate may be prepared as follows:

A mixture of 25 g. of hydrated vanadium oxide ($V_2O_5.2H_2O$) and 80 g. of butyl alcohol distilled into a separator which removes the water of reaction and returns the alcohol to the still. After eight hours distillation, the dark red solution in the still is filtered and the insoluble residue retreated. The dark red solution obtained by the first extraction is a solution of butyl vanadate in anhydrous butyl alcohol, and will show, on analysis, an equivalent of about 0.0584 g. of $V_2O_5$ per cc. or about 0.0925 g. of butyl ortho-vanadate per cc.

By an alternate method, the esters of vanadic acid may be prepared by refluxing vanadium oxytrichloride with an alcohol. Thus, for example, ethyl vanadate may be prepared as follows:

A solution of vanadium oxytrichloride in benzene is prepared by refluxing a mixture of 12.5 parts by weight of $V_2O_5.2H_2O$, 19 parts by weight of $SOCl_2$ and 40 parts by weight of benzene for a period of six hours, after which time the reaction is essentially complete. The resulting dark solution is then diluted by the addition of 200 parts by weight of benzene to facilitate its handling. To this solution is then added a 50% excess over the theoretical amount of anhydrous ethyl alcohol required to react with the $V_2O_5.2H_2O$ originally used. The solution is then refluxed until the evolution of HCl had stopped. The ethyl vanadate so formed may be recovered in pure form by distillation under reduced pressure, since the compound boils at 135° C. at 80 mm.

By another alternate method, the esters of vanadic acid may be prepared by the reaction of a metallic vanadate with an alkyl halide in the presence of an inert solvent. Thus, silver vanadate may be reacted with an alkyl bromide in benzene solution, to form the alkyl vanadate and precipitate silver bromide. This solution may then be filtered to remove the silver bromide, and the filtrate used to prepare the contact mass.

The method in accordance with this invention will be illustrated in detail by the examples which follow:

EXAMPLE I

Preparation of a catalyst using ethyl vanadate

A solution of ethyl vanadate in ethyl alcohol was prepared by the first of the two methods described hereinbefore. Granulated silica, 8–10 mesh in size was then wet with a strong alcoholic solution of the ethyl vanadate and then treated with sufficient water to effect complete hydrolysis of the ethyl vanadate. The point of complete hydrolysis was determined by the disappearance of the red color from the ethyl vanadate solution. Following the hydrolysis, the hydrated vanadium pentoxide was evenly distributed over the support. The liquid was then decanted from the coated support and the wet residue dried. The resulting contact mass was then ready for use as a catalyst for the partial oxidation of organic compounds.

EXAMPLE II

Preparation of a catalyst using butyl vanadate

To 125 g. of nitric acid washed Alundum, 6–10 mesh in size, there was added 90 cc. of a butyl vanadate solution in butyl alcohol, containing 0.0925 g. of butyl vanadate per cc. The resulting mass was then treated with 10 cc. of water. Upon thorough mixing a gel was formed and the mass was then evaporated to dryness on a steam bath. This mass was then recoated with 50 cc. of the butyl vanadate solution and 10 cc. of water again added to the mass, and the mass dried on a steam bath. The resulting contact mass contained 5.2% $V_2O_5$ and was found to be an efficient catalyst for the oxidation of benzene to maleic anhydride.

EXAMPLE III

Preparation of a catalyst using butyl vanadate

The procedure described in Example II was duplicated, with the exception that the water was added to the Alundum first, and then the butyl vanadate solution added. The resulting catalyst had an even more adherent coating of vanadium oxide than that of Example II, and was found to be an efficient catalyst for the oxidation of benzene to maleic anhydride.

The simplicity of the method in accordance with this invention is a great advantage in commercial operation. By the use of this method it is possible to prepare the contact mass in the converter in which it is to be used, and thus avoid the necessity for handling the contact mass after it is ready for use. Thus, the catalyst carrier or support can be loaded directly into the converter, treated with the solution of the hydrolyzable vanadium compound and with water, drained of excess liquid and the contact mass dried by passing hot air through the converter. In so preparing the catalyst in the converter, the esters of vanadic acid should be used as the source of the vanadium pentoxide, rather than vanadium oxyhalides, if the converter is made of a material susceptible to corrosion by a halogen acid. My method may be safely carried out in the usual commercial converters, when the esters of vanadic acid are used.

It will be understood that the details and examples hereinbefore set forth are illustrative only, and that the invention as broadly described and claimed is in no way limited thereby.

What I claim and desire to protect by Letters Patent is:

1. A method for the preparation of a catalytic contact mass suitable for use in the catalytic partial oxidation of organic compounds which comprises wetting a catalyst carrier with a solution of ethyl vanadate in a substantially inert organic solvent, treating the wetted support with water, whereby the water hydrolyzes the ethyl vanadate and deposits vanadium oxide on the carrier, separating the resulting contact mass from the reaction mixture and drying it.

2. A method for the preparation of a catalytic contact mass suitable for use in the catalytic partial oxidation of organic compounds which comprises wetting a catalyst carrier with water, treating the moistened support with a solution of ethyl vanadate in a substantially inert solvent, whereby the water hydrolyzes the ethyl vanadate and deposits vanadium oxide on the carrier, separating the resulting contact mass from the reaction mixture and drying it.

3. A method for the preparation of a catalytic contact mass suitable for use in the catalytic partial oxidation of organic compounds which comprises wetting a catalyst carrier with a solution of butyl vanadate in a substantially inert organic solvent, treating the wetted support with water, whereby the water hydrolyzes the butyl vanadate and deposits vanadium oxide on the carrier, separating the resulting contact mass from the reaction mixture and drying it.

4. A method for the preparation of a catalytic contact mass suitable for use in the catalytic partial oxidation of organic compounds which comprises wetting a catalyst carrier with water, treating the moistened support with a solution of butyl vanadate in a substantially inert solvent, whereby the water hydrolyzes the butyl vanadate and deposits vanadium oxide on the carrier, separating the resulting contact mass from the reaction mixture and drying it.

5. A method for the preparation of a catalytic contact mass suitable for use in catalytic partial oxidation of organic compounds, which comprises contacting water and a solution of an ester of vanadic acid in a substantially inert organic solvent, in the presence of a catalyst carrier, the said ester of vanadic acid being readily hydrolyzable by water at ordinary room temperatures, whereby the water hydrolyzes the said ester and deposits vanadium oxide on the carrier, separating the resulting contact from the reaction mixture and drying it.

6. A method for the preparation of a catalytic contact mass suitable for use in the catalytic partial oxidation of organic compounds which comprises wetting a catalyst carrier with a solution of an ester of vanadic acid in a substantially inert organic solvent, the said ester of vanadic acid being readily hydrolyzable by water at ordinary room temperatures, treating the wetted support with water, whereby the water hydrolyzes the ester of vanadic acid and deposits vanadium oxide on the carrier, separating the resulting contact mass from the reaction mixture and drying it.

7. A method for the preparation of a catalytic contact mass suitable for use in the catalytic partial oxidation of organic compounds which comprises wetting a catalyst carrier with water, treating the moistened support with a solution of an ester of vanadic acid in a substantially inert solvent, the said ester of vanadic acid being readily hydrolyzable by water at ordinary room temperatures, whereby the water hydrolyzes the ester of vanadic acid and deposits vanadium oxide on the carrier, separating the resulting contact mass from the reaction mixture and drying it.

EDWIN R. LITTMANN.